United States Patent
Sasaki et al.

(10) Patent No.: US 10,908,693 B2
(45) Date of Patent: Feb. 2, 2021

(54) TACTILE PRESENTATION DEVICE

(71) Applicant: Tianma Japan, Ltd., Kanagawa (JP)

(72) Inventors: Harue Sasaki, Kanagawa (JP); Hiroshi Haga, Kanagawa (JP); Koji Shigemura, Kanagawa (JP); Hirotsugu Yamamoto, Utsunomiya (JP)

(73) Assignees: Wuhan Tianma Micro-Electronics Co., Ltd., Wuhan (CN); TIANMA JAPAN, LTD., Kanagawa (JP)

( * ) Notice: Subject to any disclaimer, the term of this patent is extended or adjusted under 35 U.S.C. 154(b) by 0 days.

(21) Appl. No.: 16/795,646

(22) Filed: Feb. 20, 2020

(65) Prior Publication Data

US 2020/0264704 A1 Aug. 20, 2020

(30) Foreign Application Priority Data

Feb. 20, 2019 (JP) .................................. 2019-028905
Nov. 27, 2019 (JP) .................................. 2019-213924

(51) Int. Cl.
*G06F 3/041* (2006.01)
*G06F 3/01* (2006.01)
*G06F 3/0488* (2013.01)

(52) U.S. Cl.
CPC .............. *G06F 3/016* (2013.01); *G06F 3/012* (2013.01); *G06F 3/0414* (2013.01); *G06F 3/0488* (2013.01); *G06F 2203/0381* (2013.01)

(58) Field of Classification Search
CPC . G06F 3/01; G06F 3/012; G06F 3/016; G06F 3/0414; G06F 3/04144; G06F 3/044; G06F 3/0448; G06F 2203/0381
See application file for complete search history.

(56) References Cited

U.S. PATENT DOCUMENTS

| | | | | |
|---|---|---|---|---|
| 7,109,967 B2* | 9/2006 | Hioki | .................... | G06F 3/0412 345/104 |
| 2011/0310028 A1* | 12/2011 | Camp, Jr. | ............... | G06F 3/016 345/173 |
| 2012/0194463 A1* | 8/2012 | Tierling | ................ | G01H 13/00 345/173 |
| 2012/0262394 A1 | 10/2012 | Sanma et al. | | |
| 2012/0326999 A1* | 12/2012 | Colgate | ................... | G06F 3/016 345/173 |
| 2013/0099907 A1* | 4/2013 | Ching | ..................... | G06F 3/016 340/407.1 |

(Continued)

FOREIGN PATENT DOCUMENTS

| | | |
|---|---|---|
| JP | 2013-97438 A | 5/2013 |
| JP | 6489120 B2 | 3/2019 |
| WO | 2015151380 A1 | 10/2015 |

*Primary Examiner* — Joe H Cheng

(74) *Attorney, Agent, or Firm* — Sughrue Mion, PLLC

(57) ABSTRACT

A tactile presentation device includes a touch surface fixed in orientation, an actuator configured to vibrate the touch surface along one axis within the plane of the touch surface, and a controller configured to control vibration of the actuator along the one axis to present tactile stimulus to a finger in contact with the touch surface. The controller is configured to control the actuator in such a manner that direction to start vibration for presenting tactile stimulus to the finger is within a range from minus 43° to plus 43° with respect to a direction of gravity projected on the touch surface or the opposite direction thereof.

10 Claims, 13 Drawing Sheets

(56) References Cited

U.S. PATENT DOCUMENTS

| | | | |
|---|---|---|---|
| 2013/0215079 A1* | 8/2013 | Johnson | G06F 3/041 345/174 |
| 2013/0265268 A1* | 10/2013 | Okumura | G06F 3/04847 345/173 |
| 2014/0071071 A1* | 3/2014 | Hirose | G06F 3/044 345/173 |
| 2014/0078102 A1* | 3/2014 | Araki | G06F 3/04883 345/174 |
| 2014/0118127 A1* | 5/2014 | Levesque | G06F 3/016 340/407.2 |
| 2014/0208204 A1* | 7/2014 | Lacroix | G06F 3/041 715/702 |
| 2016/0132115 A1* | 5/2016 | Haga | G06F 3/0412 345/173 |
| 2016/0328019 A1* | 11/2016 | Taninaka | G06F 3/0485 |
| 2017/0097681 A1 | 4/2017 | Ono et al. | |
| 2019/0332176 A1* | 10/2019 | Yang | G06F 3/016 |
| 2019/0391653 A1 | 12/2019 | Ono et al. | |

* cited by examiner

| AVERAGE SCORE OF ALL EVALUATORS | | ANGLE OF DISPLACEMENT IN FORMER VIBRATION [°] | | | | AVERAGE SCORE AT EACH ANGLE (LATTER) |
|---|---|---|---|---|---|---|
| | | 0 | 90 | 180 | 270 | |
| ANGLE OF DISPLACEMENT IN LATTER VIBRATION [°] | 0 | | 1.333 | 0.833 | 1.167 | 0.833 |
| | 90 | -1.500 | | -1.667 | -0.167 | -0.833 |
| | 180 | -0.333 | 1.167 | | 1.167 | 0.500 |
| | 270 | -0.833 | 0.833 | -1.333 | | -0.333 |
| AVERAGE SCORE AT EACH ANGLE (FORMER) | | -0.667 | 0.833 | -0.542 | 0.542 | |
| PSYCHOLOGICAL SCALE VALUE [EFFECT OF EACH ANGLE] | | -0.750 | 0.833 | -0.521 | 0.438 | |

| FACTOR | SUM OF SQUARED DEVIATIONS S | DEGREE OF FREEDOM φ | UNBIASED VARIANCE V | VARIANCE RATIO $F_0$ | SIGNIFICANCE PROBABILITY p |
|---|---|---|---|---|---|
| MAIN EFFECT α | 82.54 | 3 | 27.51 | 28.14 | 0.00 (**) |
| COMBINATION EFFECT γ | 3.46 | 3 | 1.15 | 1.18 | 0.33 |
| ORDER EFFECT δ | 3.33 | 6 | 0.56 | 0.57 | 0.75 |
| RESIDUAL E | 58.67 | 60 | 0.98 | | |
| TOTAL | | 72 | | | |

TACTILE PRESENTATION DEVICE

CROSS-REFERENCE TO RELATED APPLICATIONS

This Non-provisional application claims priority under 35 U.S.C. § 119(a) on Patent Application No. 2019-28905 filed in Japan on Feb. 20, 2019 and Patent Application No. 2019-213924 filed in Japan on Nov. 27, 2019, the entire contents of which are hereby incorporated by reference.

BACKGROUND

This disclosure relates to a tactile presentation device.

In recent years, electronic devices including a touch panel, such as smartphones and car navigation systems, have been prevailing. When the user operates an object such as an icon included in the user interface displayed through the touch panel, the electronic device activates the function associated with the object.

The surface of the touch panel is uniformly solid and therefore, the touch panel provides the same tactile sensation to the user no matter what part of the touch panel the user's finger touches. For this reason, there is a known technique to provide feedback that makes the user perceive the existence of an object or the acceptance of operation of an object together with activation of the function associated therewith. This technique vibrates the touch panel within its plane to present tactile stimulus to the finger in contact with the touch panel.

SUMMARY

The inventors found that the user feels the strength of the stimulus differently depending on the relation between the direction of the in-plane vibration of the touch surface and the axis of the finger in contact with the touch surface. Specifically, the inventors found that vibration in the direction perpendicular to the long axis of the finger (the axis along which the finger extends) provides the user with weaker stimulus than the same vibration in the parallel direction. When the stimulus given to the finger is weak, the user has difficulty in perceiving a specific tactile sensation (for example, a click).

An aspect of this disclosure is a tactile presentation device including a touch surface fixed in orientation, an actuator configured to vibrate the touch surface along one axis within the plane of the touch surface, and a controller configured to control vibration of the actuator along the one axis to present tactile stimulus to a finger in contact with the touch surface. The controller is configured to control the actuator in such a manner that direction to start vibration for presenting tactile stimulus to the finger is within a range from minus 43° to plus 43° with respect to a direction of gravity projected on the touch surface or the opposite direction thereof.

Another aspect of this disclosure is a tactile presentation device including a touch surface, an actuator configured to vibrate the touch surface along one axis within the plane of the touch surface, and a controller configured to control vibration of the actuator along the one axis to present tactile stimulus to a finger in contact with the touch surface. The controller is configured to presume orientation of the finger in contact with the touch surface projected on the touch surface, and control the actuator in such a manner that intensity of the vibration changes depending on the projected orientation.

Another aspect of this disclosure is a tactile presentation device including a touch surface, a display device fixed in a relative position to the touch surface, an actuator configured to vibrate the touch surface along one axis within the plane of the touch surface, and a controller configured to control vibration of the actuator along the one axis to present tactile stimulus to a finger in contact with the touch surface. The controller is configured to control the actuator in such a manner that direction to start vibration for presenting tactile stimulus to the finger is within a range from minus 43° to plus 43° with respect to a direction from the top to the bottom of an image displayed on the display device or the opposite direction thereof.

Another aspect of this disclosure is a tactile presentation device including a touch surface fixed in orientation, an actuator configured to vibrate the touch surface along one axis within the plane of the touch surface, a spring configured to define a neutral position of vibration of the touch surface, and a controller configured to control vibration of the actuator along the one axis to present tactile stimulus to a finger in contact with the touch surface. The actuator is a solenoid actuator. The controller is configured to apply a first driving pulse and a second driving pulse to the solenoid actuator. The first driving pulse and the second driving pulse have the same voltage amplitude. The second driving pulse has the width shorter than the width of the first driving pulse.

It is to be understood that both the foregoing general description and the following detailed description are exemplary and explanatory and are not restrictive of this disclosure.

EMBODIMENTS

Hereinafter, embodiments of this disclosure are described with reference to the accompanying drawings. It should be noted that the embodiments are merely examples to implement this disclosure and not to limit the technical scope of this disclosure.

Embodiment 1

Figure 1:
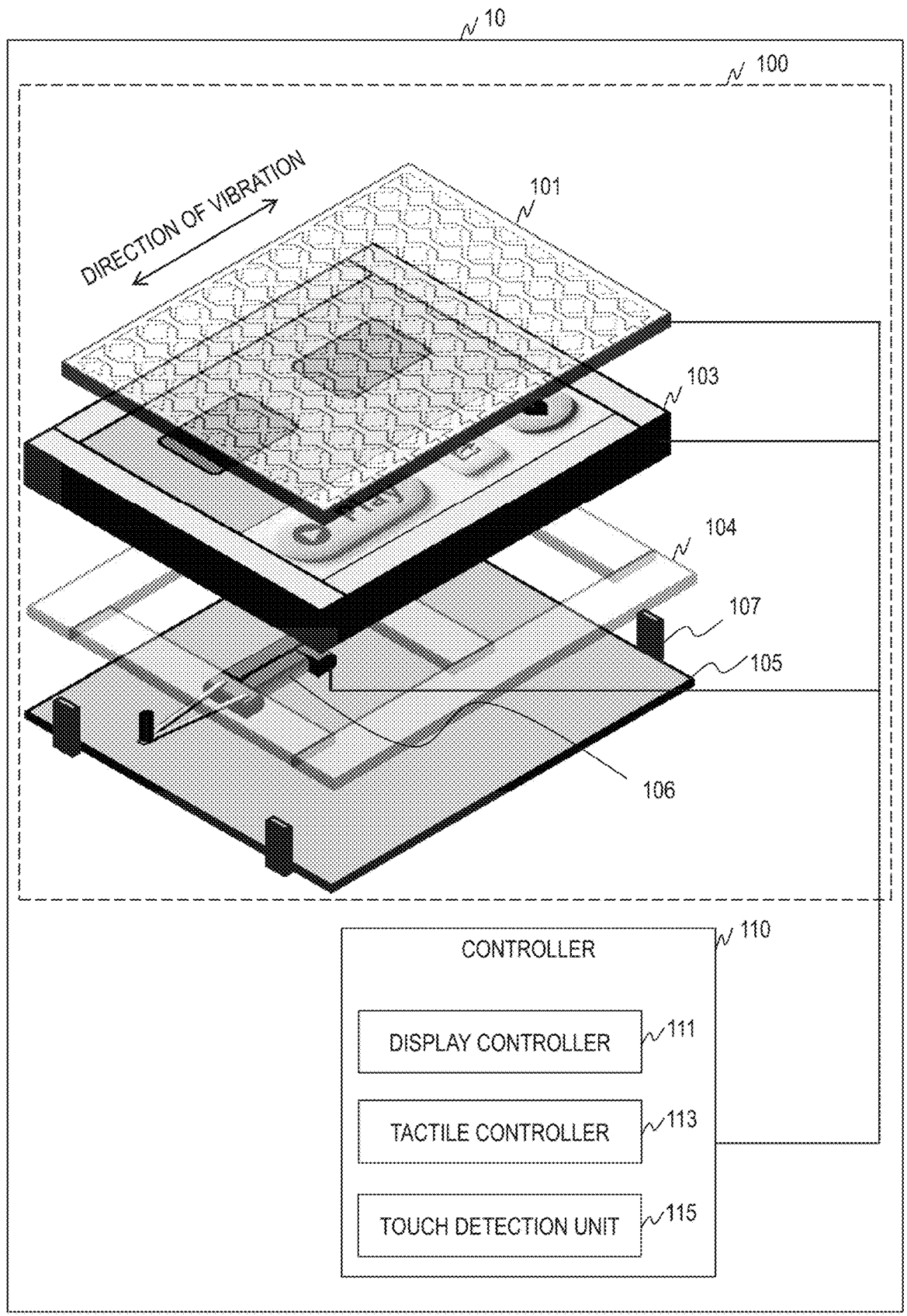
FIG. 1 is a diagram illustrating an example of the configuration of an electronic device in Embodiment 1.

FIG. 1 is a diagram illustrating an example of the configuration of an electronic device 10 in Embodiment 1. The electronic device (tactile presentation device) 10 includes a tactile presentation panel 100 and a controller 110. The tactile presentation panel 100 and the controller 110 are connected by wiring.

The tactile presentation panel 100 presents a user interface (UI) including at least one object (image) to the user and receives operation through the UI. The tactile presentation panel 100 also provides the user with tactile stimulus to make the user perceive the operation of the object included in the UI.

The tactile presentation panel 100 includes a touch panel 101, a liquid crystal display 103, a carrier 104, a base 105, a lateral actuator 106, and leaf springs 107. The components of the tactile presentation panel 100 can be stored in a desired housing. The touch panel 101 and the liquid crystal display 103 are to provide a display screen for displaying the UI thereon. The carrier 104, the lateral actuator 106, and the leaf springs are to provide mechanical vibration.

The base 105 is a component to be a mount for the tactile presentation panel 100. The lateral actuator 106 and the leaf springs 107 are mounted on the base 105. The carrier 104 that vibrates with movement of the lateral actuator 106 and the leaf springs 107 is also mounted on the base 105. The carrier 104 is vibrated by the lateral actuator 106 along a specific axis with respect to the base 105. This vibration is also referred to as lateral motion. The vibration of the carrier 104 produced by the lateral actuator 106 and the leaf springs 107 is mechanical vibration. In the following description, the vibration for presenting tactile stimulus is one or more cycles of reciprocating motion.

The lateral actuator 106 is a device to generate motion along a single axis that is parallel to the touch surface of the tactile presentation panel 100. The touch surface is the principal surface of the touch panel 101 to be touched by a finger and is a tactile presentation surface that presents tactile stimulus (tactile feedback) to the finger. The leaf springs 107 are used as a mechanism to generate vibration with the motion of the lateral actuator 106. The leaf springs 107 define a neutral position of the vibration of the touch surface. The carrier 104 is a mount for laminating components that configures a display screen. The liquid crystal display 103 and the touch panel 101 are provided on the carrier 104. The illustrated in FIG. 1 is an example of the configuration of the tactile presentation panel 100 and the tactile presentation panel 100 can have a different configuration. For example, the carrier 104 can be omitted; the liquid crystal display 103 can be directly connected with the lateral actuator 106 and the leaf springs 107.

The liquid crystal display 103 and the touch panel 101 are mounted to be substantially parallel to the base 105. The touch panel 101 is disposed in front of the liquid crystal display 103. Hereinafter, the side where the user using the tactile presentation panel 100 is located is defined as front and the opposite side is defined as back.

The touch panel 101 detects the position of the user's finger touching the touch surface that is the front face thereof. The touch panel 101 can be any type of touch panel, such as a resistive film type, a surface capacitive type, or a projected capacitive type of touch panel. Alternatively, the touch panel 101 can be a panel having a touch panel function together with a function that presents tactile stimulus generated by static electricity.

The liquid crystal display 103 displays a UI image including an object. Any type of display other than the liquid crystal display, such as organic light emitting diode (OLED) display or micro LED display, can be employed.

The controller 110 can include one or more computing devices for executing programs and one or more storage devices. The computing devices can include a processor, a graphics processing unit (GPU), a field programmable gate array (FPGA), or the like. The storage devices store programs and data to be used by the controller 110. The storage devices can include a volatile or non-volatile memory. The storage devices include a work area to be used by the programs.

The controller 110 works as function units (modules) for controlling the tactile presentation panel 100. Specifically, the controller 110 works as a display controller 111 and a tactile controller 113. The display controller 111 controls displaying the UI on the display screen. Specifically, the display controller 111 acquires setting information on the UI from the storage device and controls the liquid crystal display to display the UI including at least one object based on the information.

A touch detection unit 115 detects contact of the user's finger to the touch panel 101 based on the output from the touch panel 101 and locates the touch point of the finger on the touch panel 101. For example, when the touch detection unit 115 detects a touch to a point corresponding to a specific object image, the touch detection unit 115 outputs a request to generate mechanical vibration to the tactile controller 113.

In response to the touch detection unit 115, the tactile controller 113 controls the lateral actuator 106 to generate mechanical vibration.

The driving pulses applied to the lateral actuator 106 include a first pulse and a second pulse having the same voltage amplitude. The lateral actuator 106 displaces the touch surface in one direction from the initial state in response to application of a first pulse and then displaces the touch surface in the opposite direction in response to cease of application of the first pulse to start reciprocating motion.

Subsequently, in response to a second pulse after a predetermined period of no voltage application, the lateral actuator 106 stops the displacement at the position where the touch surface has returned to the initial state. To present sharp tactile stimulus like a click to the user, the period of no voltage application and the pulse width of the second pulse are selected so that the lateral actuator 106 will stop after only one cycle of reciprocating motion from the initial state. A longer no-voltage application period can be selected so that the lateral actuator 106 will stop after several cycles of reciprocating motion from the initial state. Then, tactile stimulus that vibrates for a long time can be presented.

The tactile presentation panel 100 can further include a force sensor. The force sensor detects the force applied by the user in the direction perpendicular to the principal surface of the tactile presentation panel 100 (touch panel 101). The tactile controller 113 makes the lateral actuator 106 vibrate if a specific area on the touch panel 101 is touched and the force detected by the force sensor is higher than a threshold. Regarding the function units included in the controller 110, some of the function units can be integrated into one function unit or one function unit can be separated into a plurality of function units by function.

Figure 2:
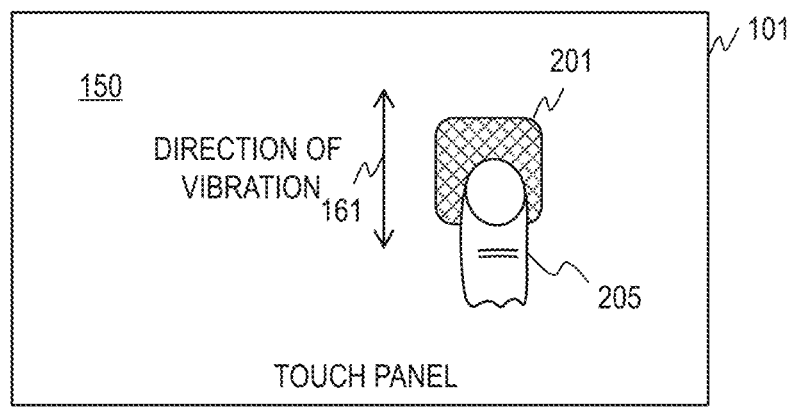
FIG. 2 illustrates a state where a finger of the user is touching the area corresponding to an object image on the touch surface of a touch panel in Embodiment 1.

Now, an example of processing to be performed by the electronic device 10 is described. FIG. 2 illustrates a state where a finger 205 of the user is touching the area corresponding to an object image 201 on the touch surface 150 of the touch panel 101. When the user's finger 205 (or a pointer other than the finger) touches the area of the specific object image 201, the electronic device 10 makes the touch panel 101 (tactile presentation panel 100) vibrate in the direction of vibration (two directions opposite to each other) 161. This vibration provides tactile stimulus such as a click to the user's finger 205.

Figure 3:
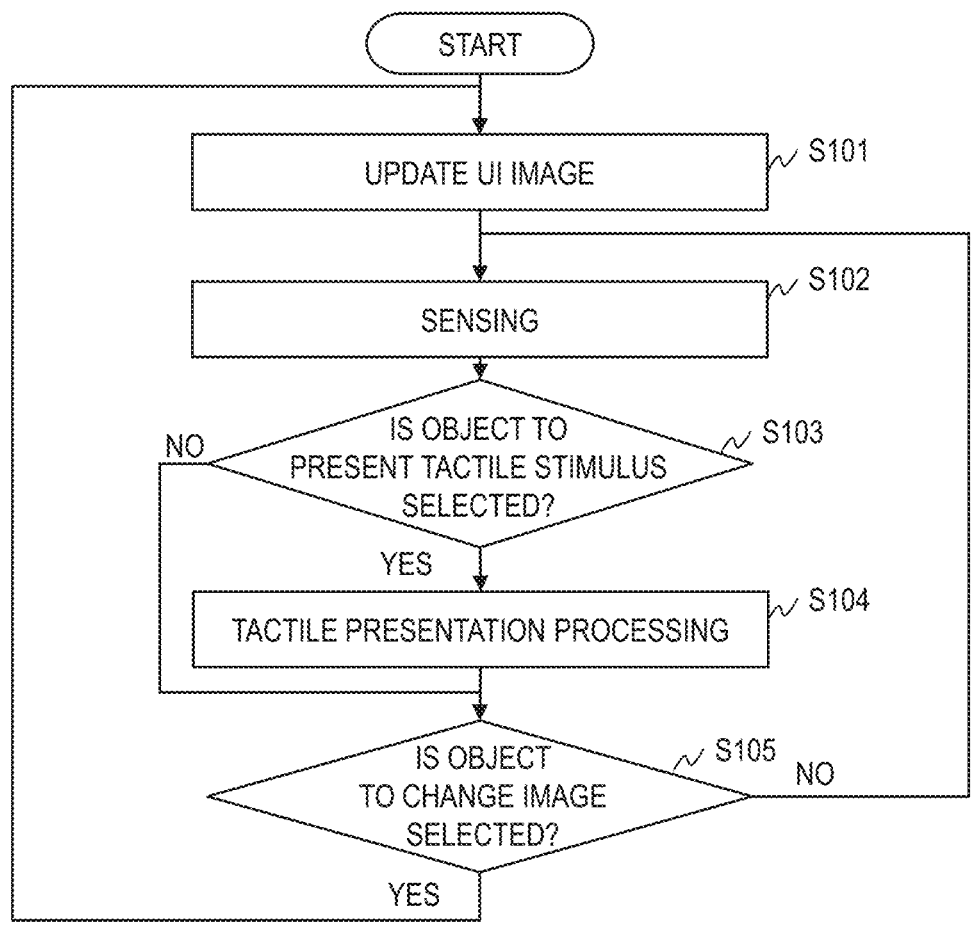
FIG. 3 is a flowchart of an example of processing to be performed by the electronic device in Embodiment 1.

FIG. 3 is a flowchart of an example of processing to be performed by the electronic device 10. The display controller 111 selects an UI image in accordance with the user's operation and controls the liquid crystal display 103 to display the selected new UI image (Step S101). The display controller 111 stores locational information on the area of an object image intended to provide tactile stimulus by in-plane vibration of the touch panel 101 to the storage device.

The touch detection unit 115 performs sensing (Step S102). The sensing detects a touch of a user's finger to the touch panel 101 and locates the touch area on the touch panel 101. Specifically, the touch detection unit 115 detects a signal representing a touch of a user's finger from the touch panel 101. For example, the touch detection unit 115 detects a change in electrostatic capacitance of the touch panel 101 as a signal.

The touch detection unit 115 calculates the coordinates of the contact point of the user's finger on the touch panel 101. For example, the coordinates are calculated based on the locations of the electrodes where change in electrostatic capacitance is detected. The touch detection unit 115 stores the calculated coordinates to the storage device. The touch detection unit 115 notifies the tactile controller 113 of a touch to the touch panel 101.

If the object intended to present tactile stimulus is touched (S103: YES), the tactile controller 113 performs tactile presentation processing (S104). Specifically, upon receipt of a notification from the touch detection unit 115, the tactile controller 113 acquires locational information on the object image to present tactile stimulus and locational information on the touch area from the storage device and compares them. If the touch area overlaps the area of the object image in at least a part of it, the tactile controller 113 makes the tactile presentation panel 100 (touch panel 101) vibrate along one axis in its plane to provide the user with feedback by mechanical vibration.

Specifically, the tactile controller 113 controls the lateral actuator 106 to generate mechanical vibration. As a result, the carrier 104 vibrates along one specific axis (in a specific direction). Since the liquid crystal display 103 and the touch panel 101 are mounted on the carrier 104, the liquid crystal display 103 and the touch panel 101 vibrate together with the carrier 104.

The touch detection unit 115 notifies the display controller 111 of another touch to the touch panel 101. The display controller 111 acquires locational information on the touch area from the storage device and identifies the relation between the location of the touch area and the UI image on the display. If an object to change the UI image is selected (S105: YES), the display controller 111 changes the UI image into a new one (S101).

Next, tactile presentation by the tactile controller 113 and the lateral actuator 106 is described. The tactile controller 113 makes the touch panel 101 (tactile presentation panel 100) vibrate along one axis along its touch surface (principal surface) to provide the finger in contact with the touch panel 101 with tactile stimulus (for example, a click). The inventors found through their research that the strength of the tactile stimulus felt by the user changes with the angle between the direction of in-plane vibration of the touch surface and the long axis of the finger (the axis along which the finger extends) when seen in the direction normal to the touch surface. In the following description, the angle between the axis of the finger and the direction of in-plane vibration (the axis of in-plane vibration) means the angle seen in the direction normal to the touch surface or the angle between the axis of the finger projected on the touch surface and the direction of the vibration (the axis of vibration).

Figure 4A:
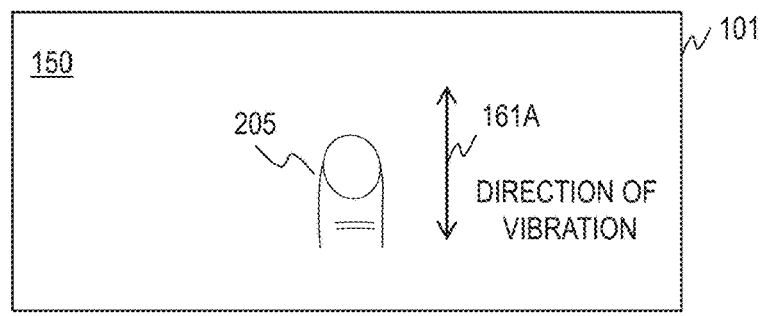
FIG. 4A illustrates a state where the long axis of a finger is substantially parallel to the direction of vibration (axis of vibration) in Embodiment 1.
Figure 4B:
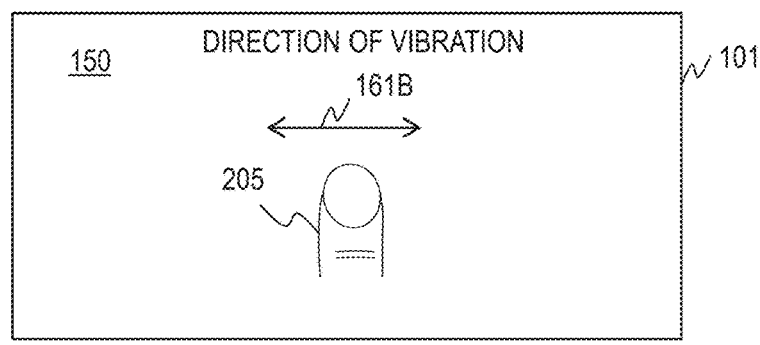
FIG. 4B illustrates a state where the long axis of a finger is substantially perpendicular to the direction of vibration (axis of vibration) in Embodiment 1.

For example, FIG. 4A illustrates a state where the long axis of a finger 205 and the direction of vibration (axis of vibration) 161A are substantially parallel, in other words, a state where the angle between the long axis along which the finger 205 extends and the direction of vibration 161A is substantially 0° or 180°. FIG. 4B illustrates a state where the long axis of the finger 205 and the direction of vibration (axis of vibration) 161B are substantially perpendicular to each other, in other words, a state where the angle between the long axis along which the finger 205 extends and the direction of vibration 161B is substantially 90° or 270°. The inventors' research revealed that the user feels tactile stimulus of the same vibration stronger in the state of FIG. 4A than in the state of FIG. 4B.

Figure 5:
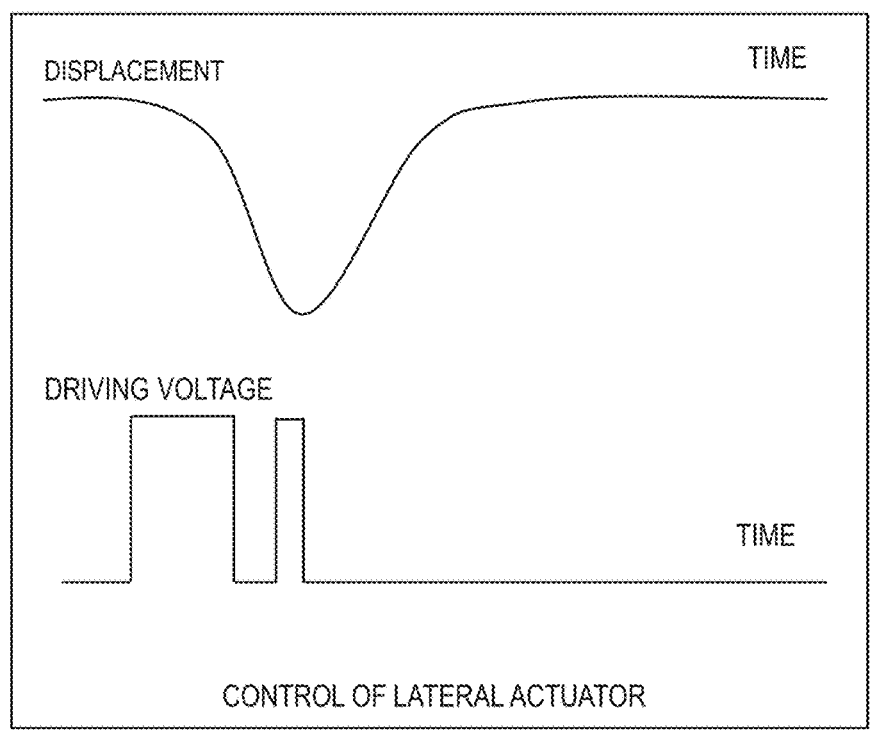
FIG. 5 schematically illustrates driving voltage applied to a linear solenoid actuator and vibration of a vibrator in measurement in Embodiment 1.

The inventors conducted measurement about the strength of tactile stimulus felt by the user in relation to the angle between the axis of vibration of the tactile presentation panel and the long axis of the finger. The measurement result is described hereinafter. The lateral actuator used in the measurement is a linear solenoid actuator. FIG. 5 schematically illustrates driving voltage applied to the linear solenoid actuator in the measurement and horizontal displacement of the touch surface. The vibrator reciprocated once to present tactile stimulus once.

In the measurement, driving voltage as shown in FIG. 5 was applied to the linear solenoid actuator when a finger is in contact with the touch surface. The linear solenoid actuator provided the evaluator with tactile stimulus (a click) by one cycle of reciprocating motion. Specifically, the linear solenoid actuator displaces the touch surface in one direction from the initial state and then displaces the touch surface in the opposite direction to return it to the initial state in accordance with the driving voltage.

More specifically, the driving voltage used in the measurement was two rectangular pulses having a voltage of 13 V. First, a first pulse having a width of 10.0 ms was applied and subsequently, a shorter second pulse having a width of 2.1 ms was applied after an interval of 4.1 ms in which no voltage was applied. The linear solenoid actuator displaces the touch surface in one direction from the initial state in response to application of the first pulse and starts displacing the touch surface in the opposite direction in response to cease of the application of the first pulse. In response to application of the second pulse, the linear solenoid actuator stops the displacement at the position where the touch surface has returned to the initial state.

That is to say, the touch surface shifts in one direction from the initial state and then shifts in the opposite direction to return to the initial state in one action of tactile presentation. In the measurement, the strength of the stimulus felt by the user in this one action of tactile presentation was evaluated. The measurement result described in the following can be obtained with any type of lateral actuator that can provide the same vibration.

Figures 6, 7:
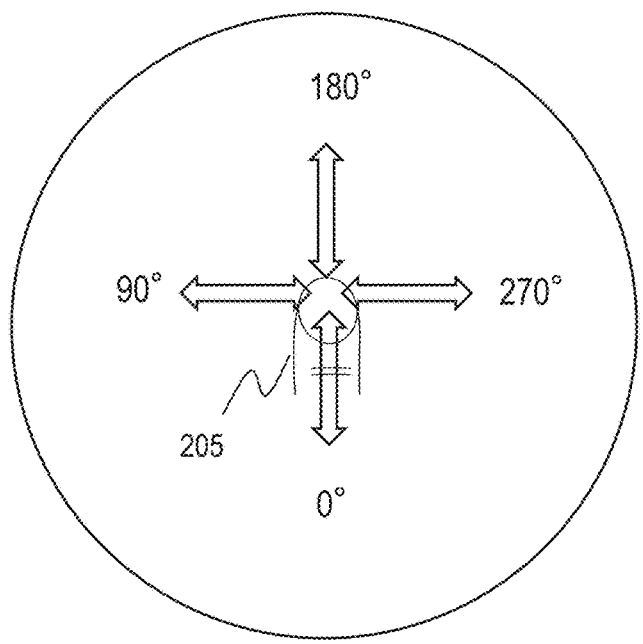
FIG. 6 illustrates directions of vibration of the actuator used in the measurement.
FIG. 7 provides subjective evaluation results in the measurement in Embodiment 1.

FIG. 6 illustrates directions of vibration of the actuator used in the measurement. Four kinds of vibration (reciprocating motion) that start in the directions at clockwisely 0°, 90°, 180°, and 270° with respect to the direction from the tip to the base of the finger 205 were provided as illustrated in FIG. 6. A plurality of evaluators subjectively evaluated the intensity of the vibration at each angle. Using Scheffe's paired comparison, the intensity of the vibration at a latter angle was evaluated in comparison to the intensity of the vibration at a former angle.

Figures 8, 9:
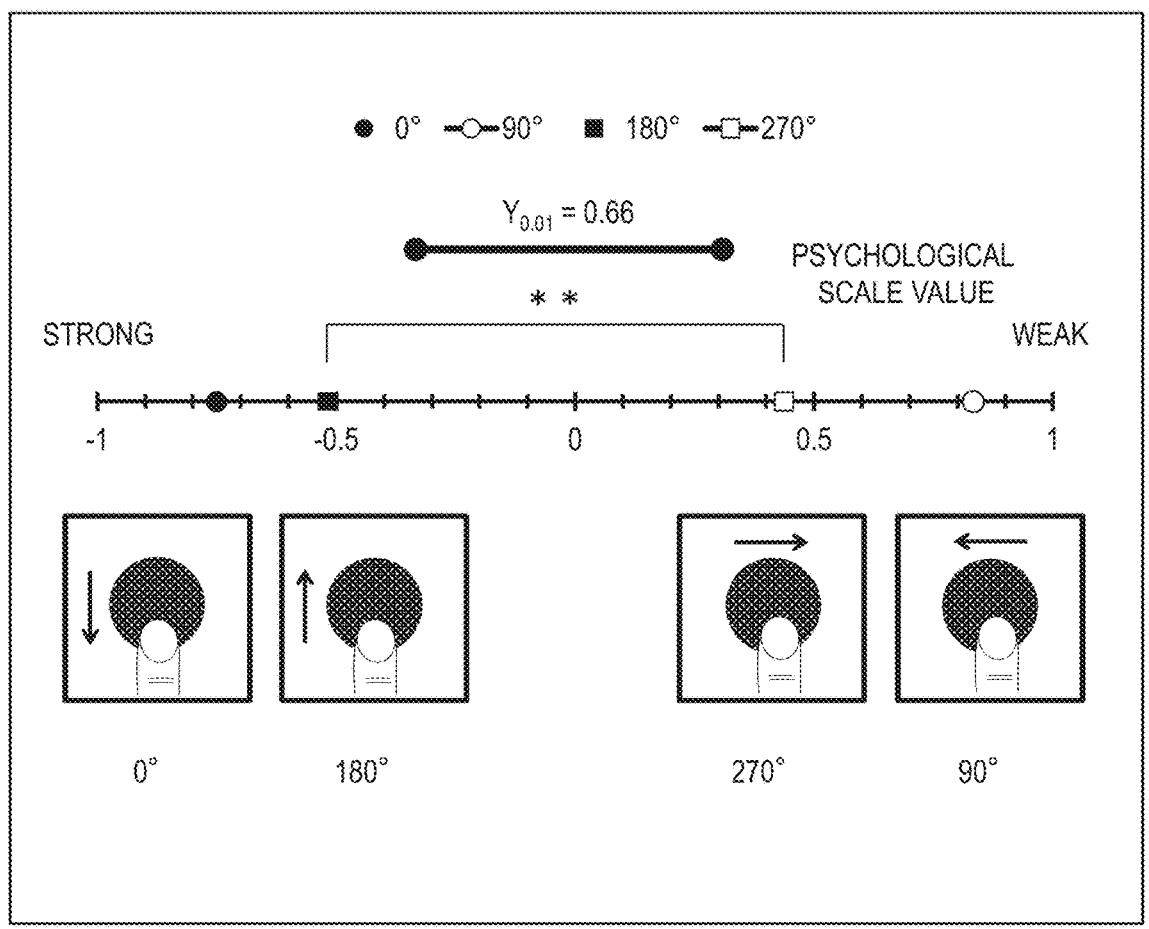
FIG. 8 is an analysis of variance table of the evaluation results in FIG. 7 in Embodiment 1.
FIG. 9 illustrates relations of the psychological scale values of the four directions of vibration to a yardstick $Y_{0.01}$ in Embodiment 1.

FIG. 7 provides the subjective evaluation results in the measurement. The evaluation scores are defined as 2 when the vibration at the latter angle is stronger than the vibration at the former angle, 1 when the vibration at the latter angle is a little stronger than the vibration at the former angle, 0 when there is no difference, −1 when the vibration at the latter angle is a little weaker than the vibration at the former angle, and −2 when the vibration at the latter angle is weaker than the vibration at the former angle. The psychological scale value is given by (average evaluation score (former)− average evaluation score (latter))/2. FIG. 8 is an analysis of variance table of the evaluation results shown in FIG. 7. This experiment result indicates that the "main effect a" shows a significant difference at a 1% risk for the "residual E".

FIG. 9 illustrates relations of the psychological scale values of the four directions of vibration and a yardstick $Y_{0.01}$. The yardstick $Y_{0.01}$ is expressed as the formula below. In the formula, q represents the studentized range; $V_E$ represents the unbiased variance of the residual E; m represents the number of objects to be evaluated (=4); and r represents the number of evaluators in this experiment.

$$Y_{0.01} = q\sqrt{\frac{V_E}{2mr}}$$

According to the analysis of the evaluation results in the above-described measurement, a significant difference was observed between the displacement vibration along the long axis of the finger (0° and 180°) and the displacement vibration along the short axis that the direction perpendicular to the long axis (90° and 270°) at a 1% risk. In other words, it was revealed that the displacement vibration along the long axis of the finger is felt to be stronger than the displacement vibration along the short axis of the finger. Meanwhile, no significant difference was observed in perceived strength between the vibration at 0° and the vibration at 180°.

The inventors further researched the direction of vibration the user feels to be stronger. Evaluators subjectively determined the direction of the vibration felt to be the strongest and the direction of the vibration felt to be the weakest. In the measurement, the relations with the direction of the long axis of the finger that touched the touch panel of the direction of the strongest vibration and the direction of the weakest vibration determined by each evaluator were measured.

Figure 10:
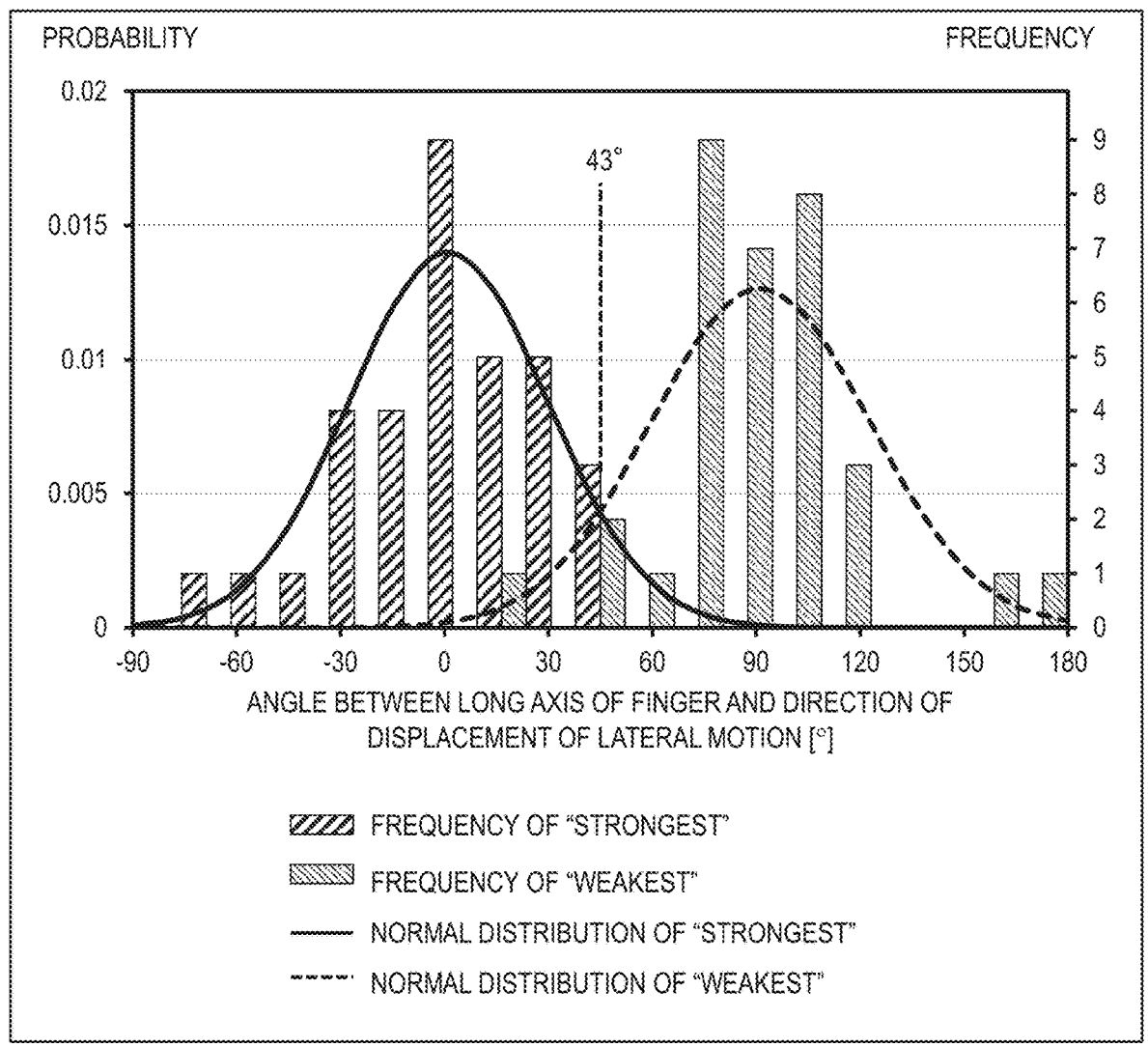
FIG. 10 is a graph showing a measurement result in Embodiment 1, including a frequency distribution of directions of vibration felt to be the strongest and a frequency distribution of directions of vibration felt to be the weakest.

FIG. 10 is a graph showing the measurement result, including a frequency distribution of the directions of the vibration felt to be the strongest and frequency distribution of the directions of the vibration felt to be the weakest. The graph further includes normal distribution curves fitted to the frequency distributions. In the graph of FIG. 10, the angle of the vibration direction at which the probability densities reverse each other (the normal distribution curves cross each other) is 43°. According to the measurement result, it is relatively frequent that the stimulus of vibration is felt to be strong when the angle of the direction to start reciprocating motion (vibration) with respect to the direction from the tip to the base of the finger along its long axis is in the range from 0° to ±43°. Since no significant difference in perceptual intensity is observed between vibration at 0° and vibration at 180° as described above, it can be said that the same applies to the range from 180° to ±43°.

Figure 11:
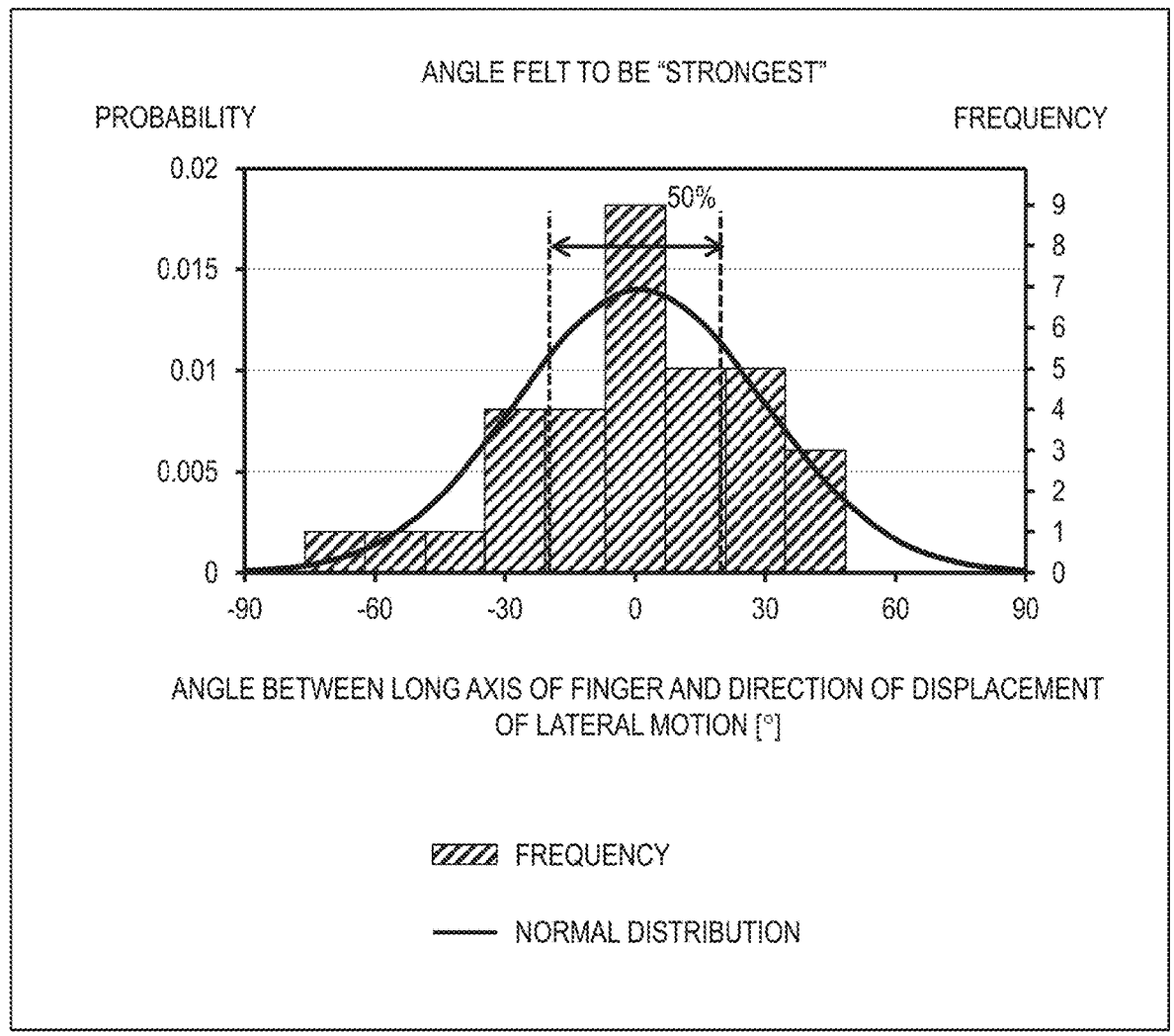
FIG. 11 is a graph showing a measurement result in Embodiment 1, including a frequency distribution of directions of vibration felt to be the strongest and a normal frequency distribution fitted to the frequency distribution.

FIG. 11 is a graph showing the measurement result including a frequency distribution of the directions of the vibration felt to be the strongest and the normal distribution curve fitted to the frequency distribution. The middle 50% of the distribution plotted by the normal distribution curve is within the range from 0° to ±19°. It indicates that the stimulus of vibration is felt to be strong more frequently when the angle of the direction to start reciprocating motion (vibration) with respect to the direction from the tip to the base of the finger along its long axis is in a range from 0° to ±19°. Since no significant difference in perceptual intensity is observed between vibration at 0° and vibration at 180° as described above, it can be said that the same applies to the range from 180° to ±19°.

In view of the above-described measurement result, preferable tactile feedback can be provided to the finger when the angle between the direction to start reciprocating motion (vibration) for the tactile feedback and one direction along the long axis of the finger is within a specific angular range. Among a large variety of electronic devices including a touch panel in practical use, some electronic devices are supposed to be used in the condition that the user is right in front of the touch surface. Automatic teller machines (ATMs) and ticket machines in stations are examples of such electronic devices.

As to an electronic device supposed to be used right in front of the user, the user usually touches its touch surface with an index finger or a middle finger. The tip of the finger touching the touch surface is usually pointing the upper side of the touch screen; in other words, the direction from the tip to the base of the finger projected on the touch surface is substantially the same as the direction of gravity projected on the touch surface.

Accordingly, in an example of the tactile presentation device having a touch surface (tactile presentation surface) fixed in orientation and supposed to be touched by a finger of a user right in front of it, like an ATM or a ticket machine, the direction to start vibration for presenting tactile stimulus is in a range from −43° to +43° with respect to the direction of gravity projected on the touch surface (0°) or the opposite direction (180°). In other words, the axis of vibration is in the range from −43° to +43° from the plumb line projected on the touch surface.

More preferably, the direction to start vibration for presenting tactile stimulus is in a range from −19° to +19° with respect to the direction of gravity projected on the touch surface (0°) or the opposite direction (180°). In other words, the axis of vibration is in the range from −19° to +19° from the plumb line projected on the touch surface. Such vibration provides appropriate tactile stimulus to more users.

As described above, the electronic device 10 of a tactile presentation device includes a touch surface 150 fixed in orientation, a lateral actuator 106 for vibrating the touch surface 150 along one axis in its plane, and a controller 110 for controlling the vibration of the lateral actuator 106 along the one axis to present tactile stimulus to a finger in contact with the touch surface 150.

The controller 110 can be configured to control the lateral actuator 106 so that the direction to start vibration for presenting tactile stimulus to the finger will be in the range from −43° to +43° with respect to the direction of gravity projected on the touch surface or the opposite direction thereof. Alternatively, the controller 110 can be configured to control the lateral actuator 106 so that the direction to start vibration for presenting tactile stimulus to the finger will be in the range from −19° to +19° with respect to the direction of gravity projected on the touch surface or the opposite direction thereof.

The above-described configurations are applicable to a device like a mobile terminal whose touch surface is not oriented in a specific fixed direction but whose display screen and the displayed image thereon are oriented in a fixed direction in relation to the touch surface. The orientation of the displayed image in relation to the display screen can be fixed all the time or in the initial setting. The direction of gravity projected on the touch surface and the opposite direction thereof can also be referred to as direction from the top to the bottom of the displayed image (display screen) and the opposite direction thereof. In the common use of the device, the direction from the top to the bottom of the displayed image is substantially parallel to the direction of gravity projected on the display screen. Accordingly, the above-described configurations can present appropriate tactile stimulus to the user.

Embodiment 2

Figure 12:
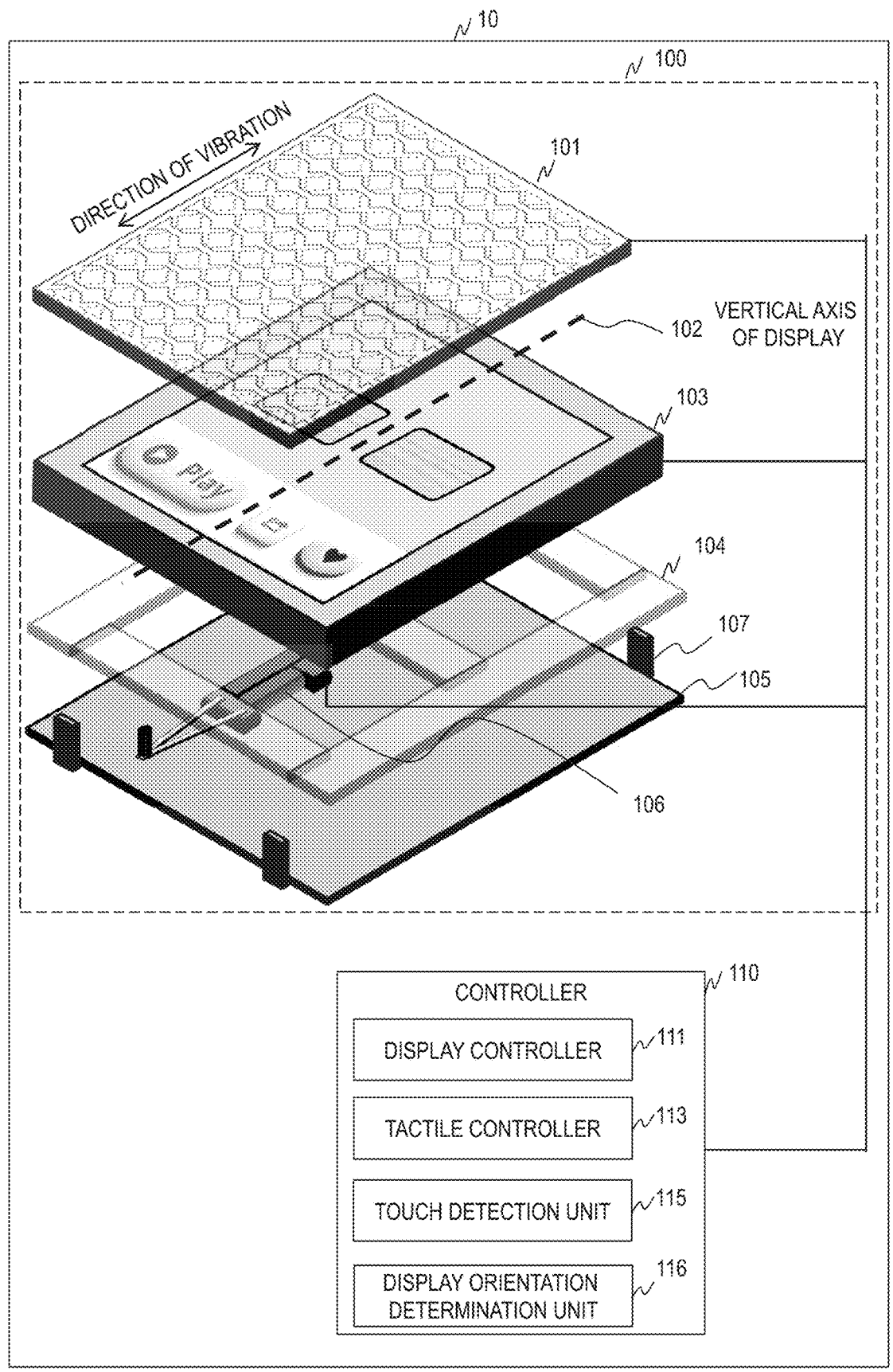
FIG. 12 is a diagram illustrating an example of the configuration of an electronic device in Embodiment 2.

FIG. 12 is a diagram illustrating an example of the configuration of an electronic device 10 in Embodiment 2. Description of the same configurations as those in Embodiment 1 is omitted. The tactile presentation panel 100 includes a touch panel 101, a liquid crystal display 103, a carrier 104, a base 105, a lateral actuator 106, and leaf springs 107.

The liquid crystal display 103 and the touch panel 101 are provided on the carrier 104. The illustrated in FIG. 12 is an example of a configuration of the tactile presentation panel 100 and the tactile presentation panel 100 can have a different configuration. For example, the carrier 104 can be omitted; the liquid crystal display 103 can be directly connected with the lateral actuator 106 and the leaf springs 107.

The liquid crystal display 103 and the touch panel 101 are mounted to be substantially parallel to the base 105. The touch panel 101 is disposed in front of the liquid crystal display 103. Hereinafter, the side where the user using the tactile presentation panel 100 is located is defined as front and the opposite side is defined as back.

The touch panel 101 can be fixed to the liquid crystal display 103 with an adhesive (such as OCA or OCR) so as to be displaced together with the liquid crystal display 103 or alternatively, the touch panel 101 can be separate from the liquid crystal display 103 so as to be displaced alone.

The liquid crystal display 103 displays a UI image including an object. As described in Embodiment 1, the liquid crystal display 103 can be replaced by any type of display other than the liquid crystal display, such as organic light emitting diode (OLED) display or micro LED display.

The controller 110 includes a display orientation determination unit 116 in addition to the function units in Embodiment 1. The display orientation determination unit 116 detects the tilt of the electronic device 10 and determines the top-bottom direction of the UI image (display) in relation to the display screen. The display orientation determination unit 116 can employ an existing technique with a three-axis gyroscope for sensing acceleration in directions of the three axes to determine the top-bottom direction of the display. The display controller 111 controls the liquid crystal display 103 based on the determination result of the display orientation determination unit 116 to display the UI image on the display screen.

To use an electronic device that includes a touch panel and that accepts operation through a UI displayed on the display screen like the one in Embodiment 2, the user usually contacts the touch surface with a finger pointing upward of the displayed image. In other words, the direction from the tip to the base of the finger projected on the touch surface is substantially the same as the top-bottom direction of the displayed image.

Accordingly, applying the measurement result described in Embodiment 1 to an example of a tactile presentation device having a touch surface (tactile presentation surface) supposed to be touched by the user who operates a UI displayed on the display screen, the direction to start vibration for presenting tactile stimulus is to be in a range from −43° to +43° with respect to the direction from the top to the bottom of the displayed image (0°) or the opposite direction (180°), in other words, the axis of vibration is in a range from −43° to +43° from the vertical axis of the display 102 to provide preferable tactile feedback to a user's finger.

More preferably, the direction to start vibration for presenting tactile stimulus is to be in a range from −19° to +19° with respect to the direction from the top to the bottom of the displayed image (0°) or the opposite direction (180°). In other words, the axis of vibration is in a range from −19° to +19° from the vertical axis of the display 102. Such vibration provides appropriate tactile stimulus to more users, like in Embodiment 1.

As described above, an electronic device 10 of a tactile presentation device includes a touch surface, a liquid crystal display 103 fixed in its relative position to the touch surface, a lateral actuator 106 for vibrating the touch surface along one axis in its plane, and a controller 110 for controlling the vibration of the lateral actuator 106 along the one axis to present tactile stimulus to a finger in contact with the touch surface.

The controller 110 can be configured to control the lateral actuator 106 so that the direction to start vibration for presenting tactile stimulus to the finger will be in the range from −43° to +43° with respect to the direction from the top to the bottom of the displayed image or the opposite direction thereof. Alternatively, the controller 110 can be configured to control the lateral actuator 106 so that the direction to start vibration for presenting tactile stimulus to the finger will be in the range from −19° to +19° with respect to the direction from the top to the bottom of the displayed image or the opposite direction thereof.

The electronic device 10 in this embodiment can be tilted and the display device therein is configured so that the top-bottom direction of the display changes with the tilt of the electronic device 10. In this case, the direction of vibration needs to be changed with the change of the orientation of the display. To achieve this configuration, a movable part (the carrier) is configured to be able to vibrate along a plurality of different axes that are parallel to the touch surface using an existing technique such as the technique according to JP 6489120 B. Alternatively, a second base with an actuator that vibrates in the direction orthogonal to the direction of vibration of the lateral actuator 106 can be added in front of or behind the base 105 in FIG. 12.

Embodiment 3

As described in Embodiment 1, tactile stimulus is felt to be changed in strength depending on the angle between the direction of in-plane vibration of the tactile presentation panel and the long axis of the finger. Specifically, tactile stimulus is felt to be strong when the direction of vibration is parallel to the long axis of the finger and is felt to be weak when the direction of vibration is perpendicular to the long axis of the finger. As the direction of vibration changes from the direction parallel to the long axis of the finger to the perpendicular direction, the strength of the tactile stimulus is felt to be decreased.

The tactile presentation device in this embodiment presumes the orientation of the finger in contact with the touch surface projected on the touch surface and controls the intensity of the in-plane vibration (lateral motion) based on the presumed orientation. When the intensity of the in-plane vibration is increased, the strength of the tactile stimulus onto the finger perceived by the user increases, as far as the angle of the finger is fixed. The tactile presentation device can increase or decrease the intensity of vibration by increasing or decreasing the displacement (amplitude), the speed, and/or the acceleration of the vibration.

Figure 13:
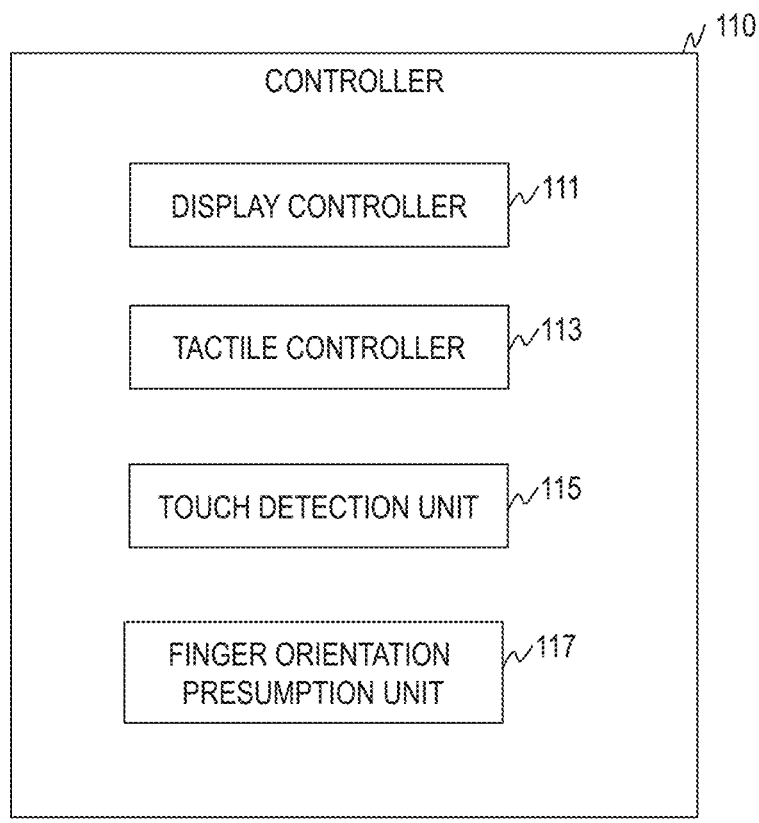
FIG. 13 schematically illustrates an example of the logical configuration of a controller in Embodiment 3.

FIG. 13 schematically illustrates an example of the logical configuration of the controller 110 in this embodiment. In addition to the function units in Embodiment 1, a finger orientation presumption unit 117 is included. The finger orientation presumption unit 117 detects the orientation of the long axis of the finger in contact with the touch surface or the angle between the axis of in-plane vibration and the long axis of the finger to presume the orientation of the finger. Examples of the method for the finger orientation presumption unit 117 to detect the orientation of the long axis of a finger will be described later. The tactile controller 113 controls the lateral actuator 106 based on the direction of the long axis of the finger detected by the finger orientation presumption unit 117.

Figure 14A:
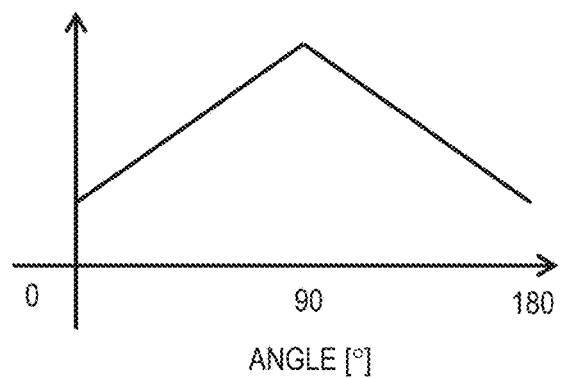
FIG. 14A illustrates an example of acceleration of a lateral actuator controlled by a tactile controller depending on the angle between the long axis of a finger and the direction of in-plane vibration in Embodiment 3.
Figure 14B:
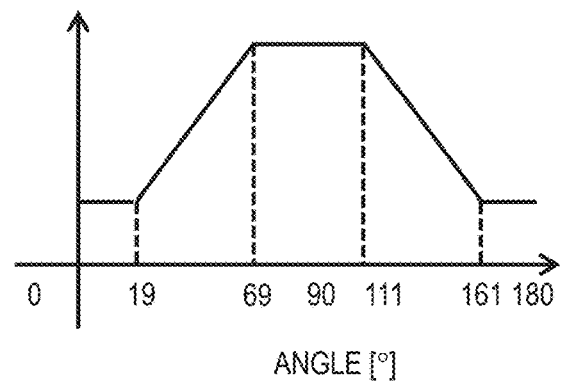
FIG. 14B illustrates another example of acceleration of a lateral actuator controlled by a tactile controller depending on the angle between the long axis of a finger and the direction of in-plane vibration in Embodiment 3.
Figure 14C:
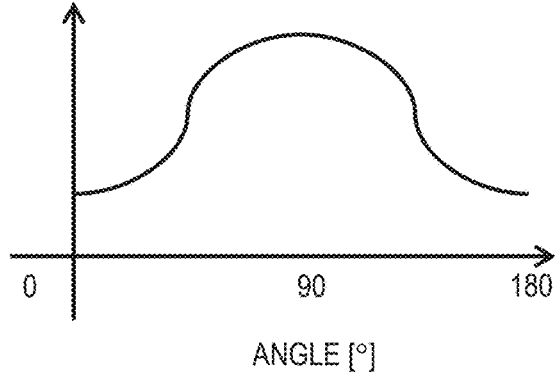
FIG. 14C illustrates still another example of acceleration of a lateral actuator controlled by a tactile controller depending on the angle between the long axis of a finger and the direction of in-plane vibration in Embodiment 3.

FIGS. 14A, 14B, and 14C illustrate examples of acceleration of the lateral actuator 106 to be controlled by the tactile controller 113 depending on the angle between the long axis of a finger and the direction of in-plane vibration. In each of the graphs of FIGS. 14A, 14B, and 14C, the horizontal axis represents the angle between the long axis of a finger and the axis of in-plane vibration. The vertical axis represents acceleration. Accordingly, each angle except for 0° and 180° corresponds to two opposite directions along the long axis of the finger. The finger orientation presumption unit 117 may detect the angle between the direction to start vibration and the direction from the tip to the base of the finger and the tactile controller 113 may control the intensity of the vibration of the lateral actuator 106 depending on the detected angle (0° to 360°) as described in Embodiment 1.

The example of the control illustrated in FIG. 14A is configured to apply the lowest acceleration when the angle is 0° and 180° at which the stimulus is easy to be perceived and apply the highest acceleration when the angle is 90° at which the stimulus is difficult to be perceived. The acceleration is proportionally increased from 0° to 90° and proportionally decreased from 90° to 180°. Although the constants of proportion in increase and decrease are the same in the example of FIG. 14A, they can be different.

The example of the control illustrated in FIG. 14B is configured to apply the lowest acceleration when the angle is 0° and 180° at which the stimulus is easy to be perceived and apply the highest acceleration when the angle is 90° at which the stimulus is difficult to be perceived. The acceleration is unchanged from 0° to 19°, proportionally increased from 19° to 69°, and unchanged from 69° to 90°. Further, the acceleration is unchanged from 90° to 111°, proportionally decreased from 111° to 161°, and unchanged from 161° to 180°. The change of the acceleration in the example of FIG. 14B is symmetric about 90°. The constants of proportion in increase and decrease can be different.

Figure 15:
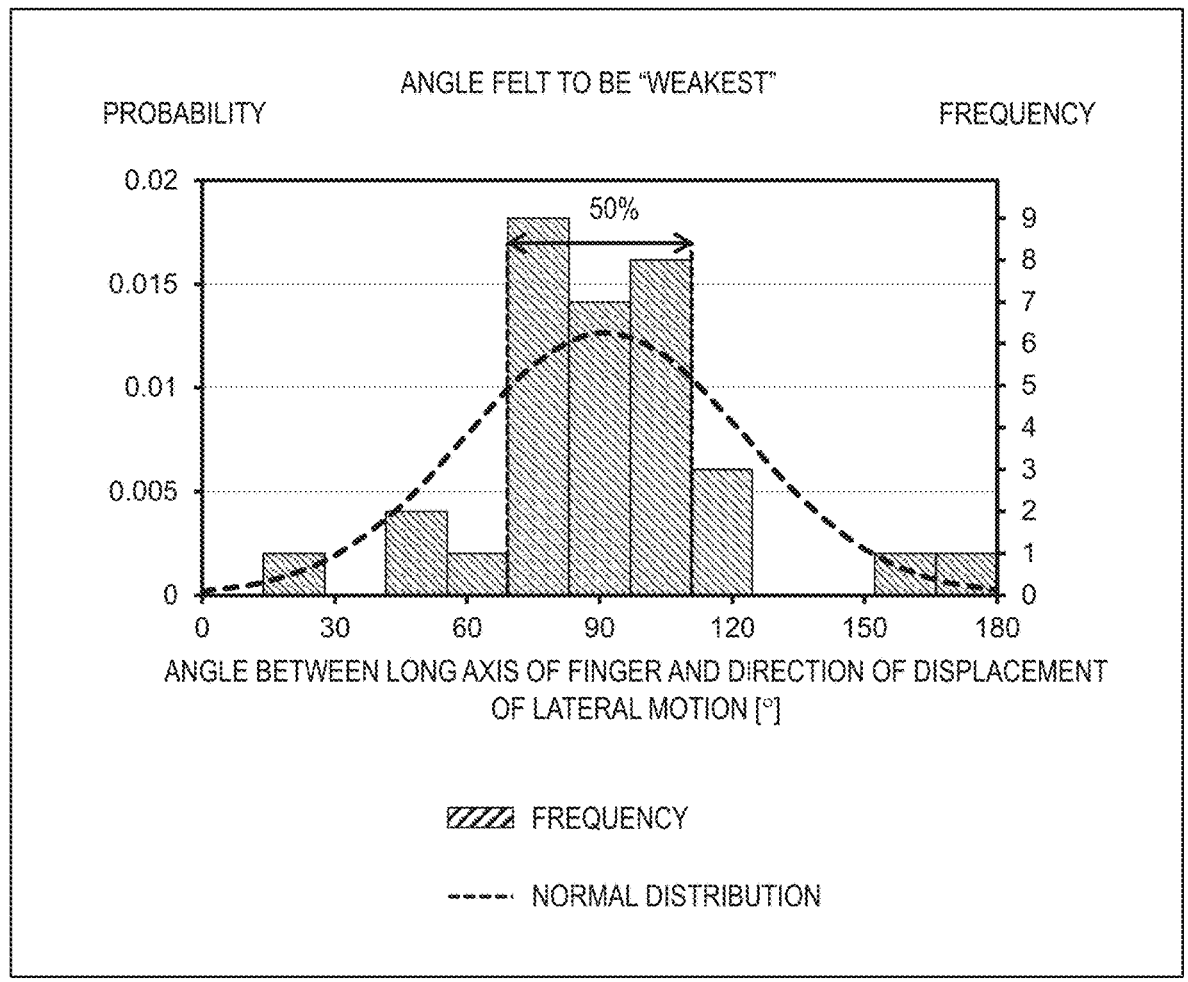
FIG. 15 provides another graph showing a measurement result described in Embodiment 1 to explain Embodiment 3.

The angles of 19° and 161° correspond to the values defining the ranges described in Embodiment 1 where the stimulus of vibration is felt to be stronger than at the other angles. The angles of 69° and 111° are selected as described as follows. FIG. 15 is another graph of the measurement result described in Embodiment 1. The graph provides the frequency distribution of the directions in which the vibration felt to be the weakest starts and a normal distribution curve fitted to the frequency distribution. The middle 50% of the distribution plotted by the normal distribution curve is within the range from 90° to ±21°. The stimulus of vibration is felt to be weak more frequently in this range. Accordingly, the highest acceleration is applied in this range. Since no significant difference in perceptual strength is observed between vibration at 90° and vibration at 270°, it can be said that the same applies to the range from −90° to ±21°.

The example of the control illustrated in FIG. 14C is configured to apply the lowest acceleration when the angle is 0° and 180° at which the stimulus is easy to be perceived and apply the highest acceleration when the angle is 90° at which the stimulus is difficult to be perceived. The acceleration is increased from 0° to 90° and decreased from 90° to 180°. The rates of increase and decrease are not constant and accord to a predetermined function. The change of the acceleration in the example of FIG. 14C is expressed by a curve. Although the change of the acceleration in FIG. 14C is symmetric about 90°, it can be asymmetric.

As described above, the controller 110 is configured to control the lateral actuator 106 in such a manner that the intensity of vibration will be stronger in the case where the orientation of the finger projected on the touch surface is perpendicular to the axis of vibration of the lateral actuator 106 than in the case where it is parallel. The controller 110 can also be configured to control the lateral actuator 106 in such a manner that the intensity of vibration will gradually increase as the projected orientation of the finger changes from parallel to perpendicular to the axis of vibration within a specific range of orientation, like in the examples of FIGS. 14A, 14B, and 14C.

Figure 16A:
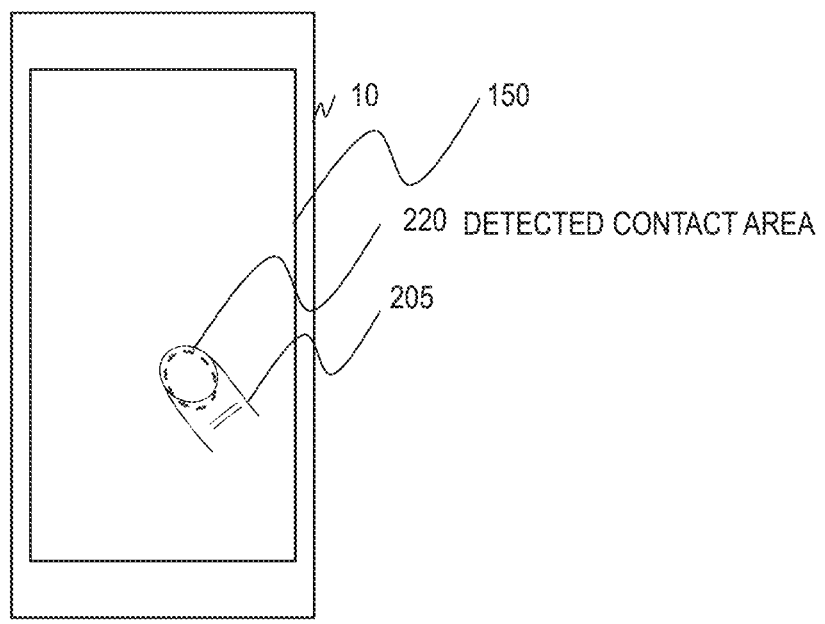
FIG. 16A illustrates a finger in contact with the touch surface and the contact area in Embodiment 3.

Next, examples of the method of detecting the orientation of the long axis of a finger are described. One known method is presuming the orientation of the finger from the contact area of the finger on the touch surface 150 of the touch panel 101. The touch panel 101 can be a capacitive touch panel. FIG. 16A illustrates a finger 205 in contact with the touch surface 150 and the contact area 220 of the finger 205. The touch detection unit 115 stores information on the shape of the contact area 220 of the finger 205 to the storage device.

Figure 16B:
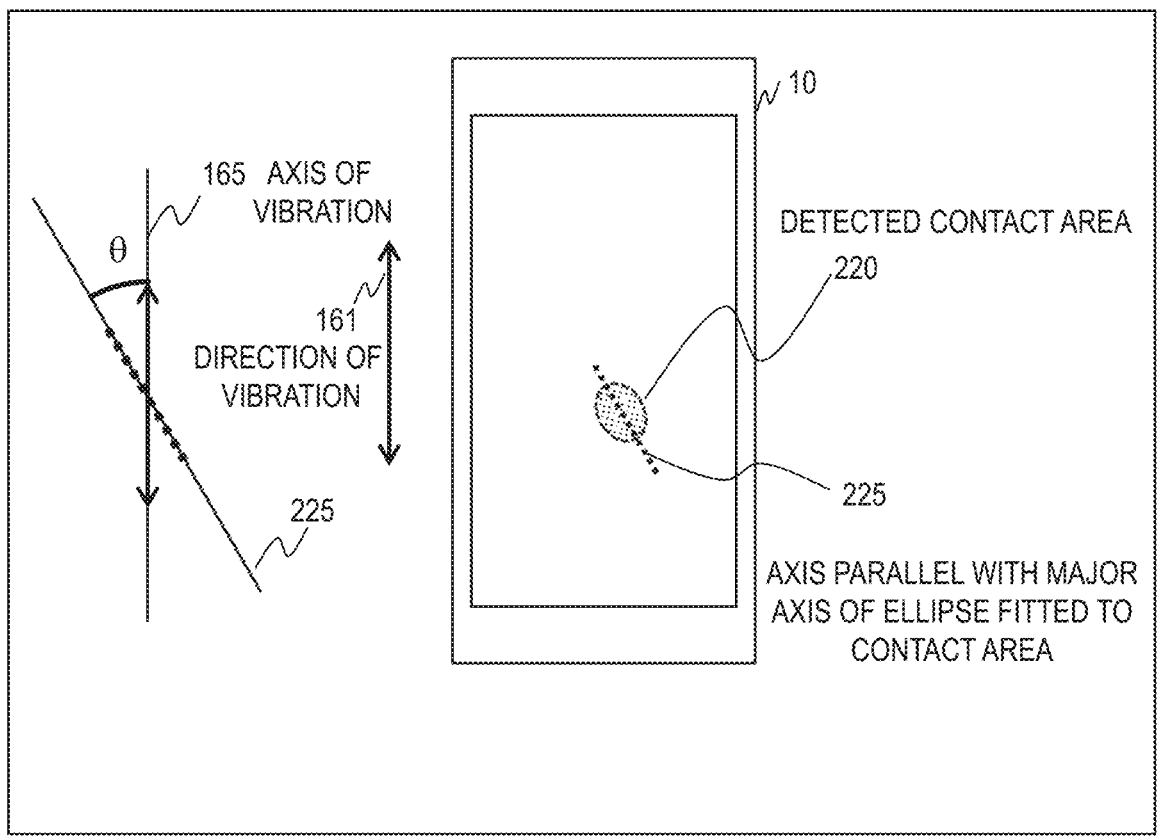
FIG. 16B illustrates a contact area of a finger and an axis parallel to the major axis of an ellipse fitted to the contact area in Embodiment 3.

The finger orientation presumption unit 117 acquires the information on the contact area 220 from the storage device and fits an ellipse to the contact area 220. The finger orientation presumption unit 117 presumes that the major axis of the fitted ellipse is parallel to the long axis of the finger. FIG. 16B illustrates the contact area 220 of the finger 205 and an axis 225 parallel to the major axis of the ellipse fitted to the contact area 220. The finger orientation presumption unit 117 stores information on the angle of the axis 225 on the touch surface 150 to the storage device. The tactile controller 113 controls the lateral actuator 106 based on the angle θ between the axis of vibration 165 and the presumed long axis 225 of the finger on the touch surface 150.

The finger orientation presumption unit 117 may determine the direction from the tip to the base of the finger on the axis 225. For example, in a case where the touch surface 150 is fixed like the one of an ATM or ticket machine described in Embodiment 1, the finger orientation presumption unit 117 can determine the direction from the tip to the base of the finger with reference to the reference direction defined in the touch surface 150 such as the direction from the top side to the bottom side of the touch surface 150. As described below, in another case where the electronic device 10 is portable and the orientation of the touch surface 150 (the reference direction thereof) with respect to the direction of gravity can be determined, the finger orientation presumption unit 117 can determine the direction from the tip to the base of the finger based on these directions.

Figure 17:
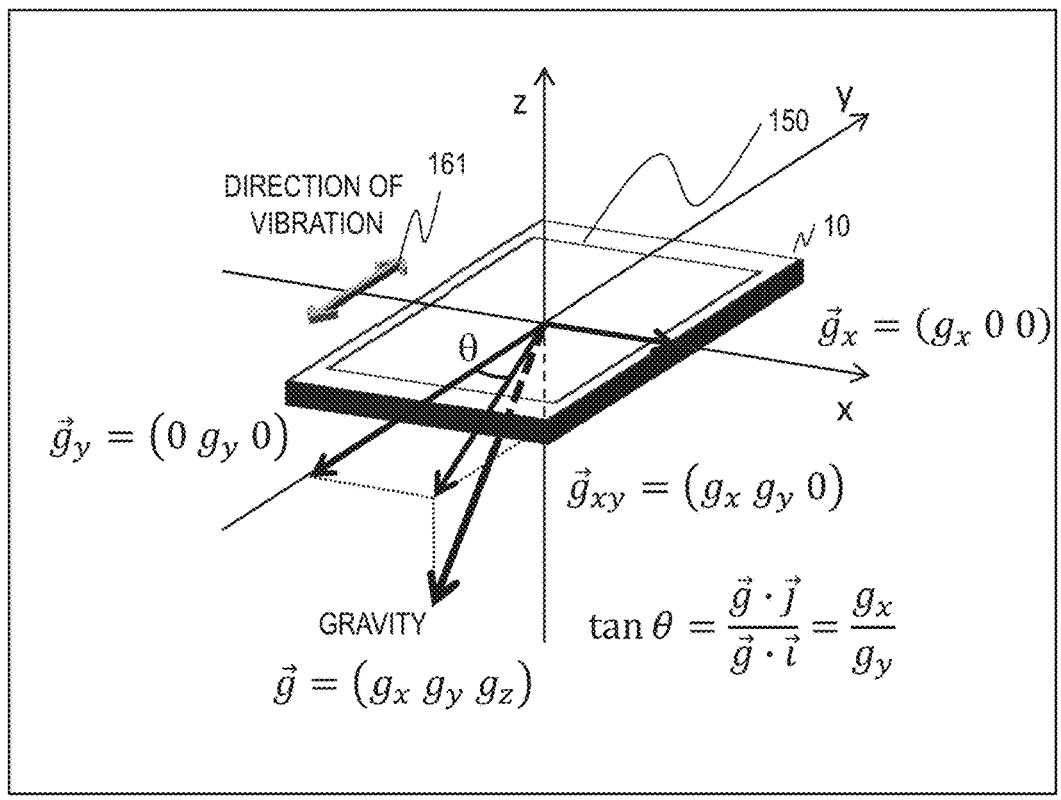
FIG. 17 illustrates a relation between a touch surface and the plumb line (the direction of gravity) in Embodiment 3.

Another method of detecting the orientation of the long axis of a finger is presuming the orientation of the finger projected on the touch surface 150 based on the output of a three-axis gyroscope (gravity sensor) included in the electronic device 10. FIG. 17 illustrates a relation between the touch surface 150 and the plumb line (the direction of gravity). The electronic device 10 is a mobile terminal; the user can desirably change its orientation.

As illustrated in FIG. 17, the touch surface 150 is defined as x-y plane and the normal to the touch surface 150 is defined as z-axis. In this example, the direction of vibration (the axis of vibration) 161 of the lateral actuator 106 is parallel to the y-axis. The gravity detected by the gyroscope in the electronic device 10 is expressed as a vector g. The finger orientation presumption unit 117 presumes the orientation of the touch surface 150 with respect to the vector g from the values of acceleration along the three axes. The finger orientation presumption unit 117 presumes that the x-y plane component $g_{xy}$ of the vector g is the direction from the tip to the base of the finger in contact with the touch surface 150.

The tactile controller 113 controls the lateral actuator 106 based on the angle θ (0° to 180°) between the x-y plane component $g_{xy}$ and the y-axis. Alternatively, the tactile controller 113 may determine the angle between the x-y plane component $g_{xy}$ and the direction to start vibration along the y-axis within the range from 0° to 360° as described in Embodiment 1 and control the lateral actuator 106 based on this angle.

Figure 18:
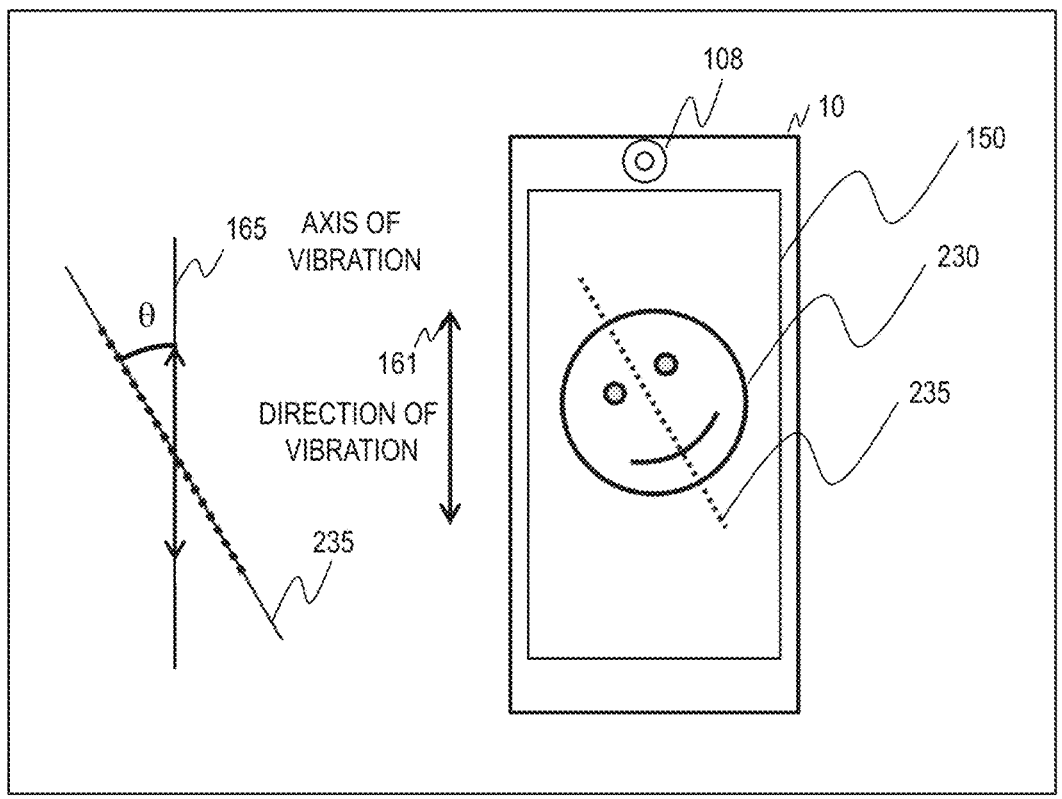
FIG. 18 schematically illustrates a relation between a facial image of the user taken by a built-in camera of the electronic device and the touch surface in Embodiment 3.

Still another method of detecting the orientation of the long axis of a finger is presuming the orientation of the finger projected on the touch surface 150 based on the orientation of the user's face in the image taken by a camera included in the electronic device 10. FIG. 18 schematically illustrates a relation between a facial image 230 of the user taken by a built-in camera 108 of the electronic device 10 and the touch surface 150.

The finger orientation presumption unit 117 performs recognition processing on the facial image 230 of the user taken by the camera 108 and determines the top-bottom axis 235 of the facial image 230. The axis 235 can be determined from the positions of the two eyes in the facial image 230. The upper side and the lower side of the image 230 along the axis 235 can be determined from the relation between the eyes and the other parts in the facial image 230. The finger orientation presumption unit 117 stores information on the angle of the axis 235 to the storage device. The information on the upper side and the lower side of the face is also stored, if necessary.

The tactile controller 113 controls the lateral actuator 106 based on the angle θ (0° to 180°) between the axis of vibration 165 and the axis 235 of the facial image 230 on the touch surface 150. Alternatively, the tactile controller 113 may determine the angle between the downward direction along the axis 235 of the facial image 230 and the direction along the axis of vibration 165 to start vibration within the range from 0° to 360° as described in Embodiment 1 and control the lateral actuator 106 based on this angle.

As set forth above, embodiments of this disclosure have been described; however, this disclosure is not limited to the foregoing embodiments. Those skilled in the art can easily modify, add, or convert each element in the foregoing embodiments within the scope of this disclosure. A part of the configuration of one embodiment can be replaced with a configuration of another embodiment or a configuration of an embodiment can be added a configuration of another embodiment.

What is claimed is:

1. A tactile presentation device comprising:
    a touch surface fixed in orientation;
    an actuator configured to vibrate the touch surface along one axis within the plane of the touch surface; and
    a controller configured to control vibration of the actuator along the one axis to present tactile stimulus to a finger in contact with the touch surface,
    wherein the controller is configured to control the actuator in such a manner that direction to start vibration for presenting tactile stimulus to the finger is within a range from minus 43° to plus 43° with respect to a direction of gravity projected on the touch surface or the opposite direction thereof.

2. The tactile presentation device according to claim 1, wherein the controller is configured to control the actuator in such a manner that direction to start vibration for presenting tactile stimulus to the finger is within a range from minus 19° to plus 19° with respect to the direction of gravity projected on the touch surface or the opposite direction thereof.

3. A tactile presentation device comprising:
a touch surface;
an actuator configured to vibrate the touch surface along one axis within the plane of the touch surface; and
a controller configured to control vibration of the actuator along the one axis to present tactile stimulus to a finger in contact with the touch surface,
wherein the controller is configured to:
presume orientation of the finger in contact with the touch surface projected on the touch surface; and
control the actuator in such a manner that intensity of the vibration changes depending on the projected orientation.

4. The tactile presentation device according to claim 3, wherein the controller is configured to control the actuator in such a manner that the intensity of the vibration is stronger in a case where the projected orientation is perpendicular to the one axis than in a case where the projected orientation is parallel to the one axis.

5. The tactile presentation device according to claim 4, wherein the controller is configured to control the actuator in such a manner that the intensity of the vibration gradually increases as the projected orientation changes from parallel to perpendicular to the one axis within a specific range of the projected orientation.

6. The tactile presentation device according to claim 3, wherein the controller is configured to increase or decrease the intensity of the vibration by increasing or decreasing displacement, speed, and/or acceleration of vibration of the actuator.

7. The tactile presentation device according to claim 3, further comprising a sensor configured to sense acceleration in directions of three axes,
wherein the controller is configured to presume the projected orientation based on output of the sensor.

8. The tactile presentation device according to claim 3, further comprising a camera configured to take an image of a face of a user having the finger,
wherein the controller is configured to presume the projected orientation of the finger based on orientation of the face.

9. A tactile presentation device comprising:
a touch surface;
a display device fixed in a relative position to the touch surface;
an actuator configured to vibrate the touch surface along one axis within the plane of the touch surface; and
a controller configured to control vibration of the actuator along the one axis to present tactile stimulus to a finger in contact with the touch surface,
wherein the controller is configured to control the actuator in such a manner that direction to start vibration for presenting tactile stimulus to the finger is within a range from minus 43° to plus 43° with respect to a direction from the top to the bottom of an image displayed on the display device or the opposite direction thereof.

10. The tactile presentation device according to claim 9, wherein the controller is configured to control the actuator in such a manner that direction to start vibration for presenting tactile stimulus to the finger is within a range from minus 19° to plus 19° with respect to a direction from the top to the bottom of an image displayed on the display device or the opposite direction thereof.

* * * * *